Dec. 18, 1934.  M. JEANNERET  1,985,170
SHOOTING SPECTACLE
Filed Feb. 23, 1933
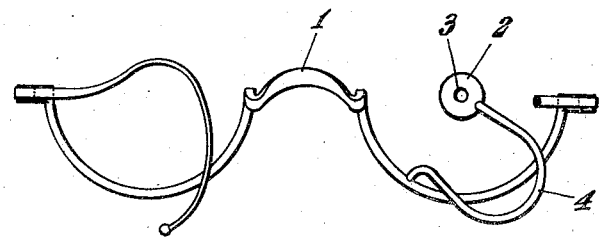
Inventor:
Max Jeanneret,
By C. F. Wendroth
Atty Patented Dec. 18, 1934

1,985,170

UNITED STATES PATENT OFFICE 1,985,170

SHOOTING SPECTACLE

Max Jeanneret, Bern, Switzerland

Application February 23, 1933, Serial No. 658,189
In Switzerland September 27, 1932

5 Claims. (Cl. 88—41)

This invention relates to spectacles for use by riflemen, marksmen, sportsmen and others.

For improving the sharpness of vision of marksmen and others, particularly in the case of wide sight, it has heretofore been proposed to use stenopaeic spectacles, but without success in practice. In these spectacles the stenopaeic aperture was at the same distance from the eye as an ordinary spectacle glass. If the said aperture was small enough, the horizon and sight could be seen clearly by the marksman, but the rest of the field of vision was so darkened that the target was not sufficiently visible. When it was attempted to obviate this defect by increasing the aperture, then the target was seen clearly, but sighting suffered so much that accurate aiming was impossible.

One of the objects of the present invention is to obviate these defects and to provide an improved construction of stenopaeic spectacles for use by marksmen and others.

The present invention is based on the fact that clear sighting and good visibility of the target can be simultaneously obtained when the stenopaeic spectacles are so constructed that the distance between the stenopaeic aperture and the eye is made as small as possible. In stenopaeic spectacles proposed heretofore this distance was determined, as in other spectacles, by the distance of the bridge of the nose and the frontal bone from the eyeball. On the average, the distance between a spectacle lens and the eye is about 14 to 15 mm.

According to the present invention the stenopaeic aperture is made in a small disc which is attached to the frame of the spectacles so that it can lie close to the eyeball.

According to a feature of the invention the diameter of the disc may be about 8 mm., and the disc may be connected with the frame by a pliable wire which permits it to occupy a desired position.

One embodiment of the invention is diagrammatically illustrated by way of example in the accompanying drawing which shows one form of stenopaeic spectacles in elevation, partly broken away.

Referring to the drawing, a small disc 2 having a central aperture 3 is mounted by means of a pliable wire 4 on a spectacles frame 1 having side pieces 5. By suitably bending the wire 4 the stenopaeic shooting spectacles can be adapted for use by any marksman.

The disc 2 may consist, e. g., of metal.

The diameter of the aperture 3, which gives the best correction for defects of vision and affords particularly good sharpness of sight, is 1 mm. The diameter of the disc itself may be 5-25 mm., but it is preferably not less than about 7.4 to 8 mm. and not substantially larger.

It is in order that the position of the disc 2 may be suited exactly to every marksman, and that it may lie as close as possible to the cornea, that it is connected with the frame by a flexible metal wire, e. g. of soft copper, to which the desired position can be given by bending. Numerous tests have shown that in consequence of this arrangement the stenopaeic aperture can be placed 13 mm. nearer the cornea than was the case in previously known stenopaeic spectacles. In order to fix the disc permanently in the most favorable position ascertained individually and to prevent undesired movement of it, the disc may be immovably connected to the frame by one or more auxiliary wires soldered to it. In each case, however, care must be taken that the disc makes with the frontal plane an angle of about 35° since every marksman when aiming turns the head somewhat, and when looking slantwise through the aperture the field of vision would be darkened.

Instead of one aperture, two or more could be provided, if desired, in order to facilitate suiting the disc to the eye of the marksman.

Instead of being made of metal the perforated disc may be composed of any other convenient opaque material. Moreover the stenopaeic aperture 3 may be dispensed with. In that case the disc will consist of a transparent material having a small transparent surface or field the size of the stenopaeic aperture, while the remainder of the surface of the disc is rendered non-transparent, e. g. by a frosting or matt treatment.

If desired, the spectacles may comprise two discs, of which the one is perforated or has a small transparent field, while the other is completely opaque and serves for covering the non-aiming eye so that it need not be shut during aiming.

I claim:—

1. Stenopaeic shooter's spectacles, comprising a lensless spectacles frame, a disc having a stenopaeic aperture therein, and a flexible and pliable member interconnecting the disc and the frame so that the disc is located in one of the lens apertures of the frame at a point just short of the cornea of the eye of the user.

2. Stenopaeic shooter's spectacles, comprising a lensless metal spectacles frame, a disc having a stenopaeic aperture therein, and a flexible wire so interconnecting the frame and disc that the latter rests in one of the lens apertures of the frame at a point just short of the cornea of the eye of the user.

3. Stenopaeic shooter's spectacles, comprising a lensless metal spectacles frame, a disc of approximately 5-25 mm. diameter, and having a stenopaeic aperture of approximately 1 mm. diameter therein, and a flexible wire so interconnecting the frame and disc that the latter rests in one of the lens apertures of the frame at a point just short of the cornea of the eye of the user.

4. Stenopaeic shooter's spectacles, comprising a lensless metal spectacles frame, a disc of approximately 8 mm. diameter, and having a stenopaeic aperture of approximately 1 mm. diameter therein, and a flexible wire so interconnecting the frame and disc that the latter rests in one of the lens apertures of the frame at a point just short of the cornea of the eye of the user.

5. Stenopaeic shooter's spectacles, comprising a lensless metal spectacles frame, a disc of approximately 8 mm. diameter and having a stenopaeic aperture of approximately 1 mm. diameter therein, and a flexible wire so interconnecting the frame and the disc that the latter rests in one of the lens apertures of the frame at a point just short of the cornea of the eye of the user, and tilted at an angle of approximately 35° to the frontal plane of the spectacles.

MAX JEANNERET.